June 6, 1939.  C. D. CUTTING  2,161,138
SPLINE SHAFT
Filed Dec. 20, 1937
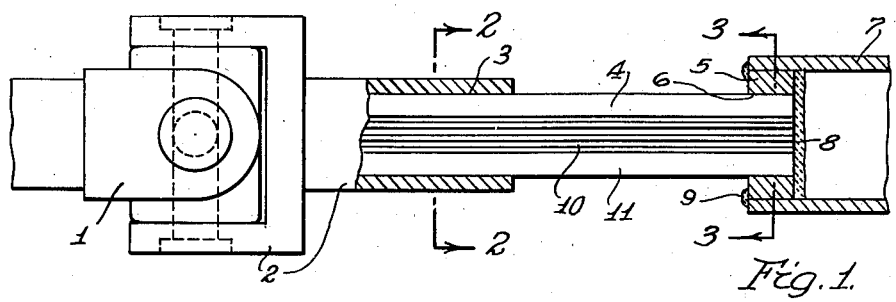
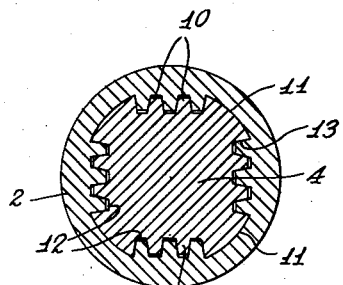
Fig. 2.
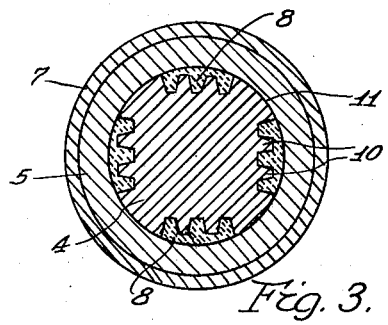
Fig. 3.
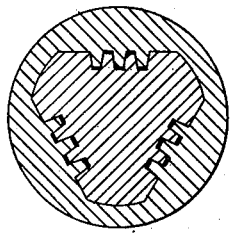
Fig. 4.
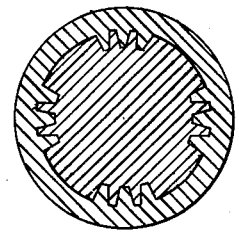
Fig. 5.
INVENTOR.
CHARLES D. CUTTING
BY
ATTORNEY.

Patented June 6, 1939

2,161,138

UNITED STATES PATENT OFFICE 2,161,138

SPLINE SHAFT

Charles D. Cutting, Detroit, Mich., assignor to The Cutting Sales & Engineering Corporation, a corporation of Michigan Application December 20, 1937, Serial No. 180,753

20 Claims. (Cl. 64—1)

This invention relates to driving or driven shafts and has for its object to provide a spline construction therefor of improved strength and quality which may be made at substantially less cost.

Another object is to provide a splined shaft construction having splines of true shape so that the actual contacting or working surfaces thereof are substantially increased in area.

Another object is to provide a shaft having a plurality of splines together with bearing areas so arranged that the splines are relieved of all except torque transmitting functions thus obviating shaft run-out and wobble.

Another object is to provide a splined shaft so constructed that the torque transmitted from the driving to the driven means is independent of the shearing strength of the splines.

A further object is to provide a splined shaft having splines in which the bending stresses have been reduced without increasing the shearing stresses whereby a stronger tooth results.

A still further object is to provide a splined shaft wherein the splines may be formed by broaching without any hobbing operation thereby accomplishing the double purpose of eliminating the usual heat treatment after completion of all machine operations and materially increasing the possible rate of production. It will be understood that broaching may be completed after heat treating so that where the broaching is the only operation the teeth have flat formations which are not subjected to deformation by subsequent heat treating. My shaft thus has teeth which have an actual increased bearing area and are very substantially stronger.

Other objects and advantages will become hereinafter more apparent as reference is had to the accompanying drawing wherein:

Fig. 1 is a side elevation of a universal joint and propeller shaft assembly, partially in section to illustrate my invention.

Fig. 2 is a diametric section taken along the line 2—2 of Fig. 1,

Fig. 3 is a diametric section taken along the lines 3—3 of Fig. 1,

Fig. 4 is a section similar to Fig. 2 showing a modified construction, and

Fig. 5 is a section similar to Fig. 4 showing a further modification.

More particularly I indicates a universal joint, the yoke 2 of which has an internal opening 3 to receive a splined shaft end 4. The shaft end 4 is inserted into a connector 5 having an opening 6 of proper shape for reception thereof and an exterior of cylindrical shape for insertion into a tubular propeller shaft 7. The connector 5 is welded at 8 to the end 4 and at 9 to the shaft 7.

The shaft end 4 is, of course, completely machined before assembly with the tube 7. It is of uniform dimensions and provided with groups of splines 10 separated by smooth curved portions 11. The cross-sectional shape of the shaft end 4 may be generally rectangular with rounded corners or octagonal as illustrated in Fig. 1, generally triangular with rounded corners or hexagonal, as illustrated in Fig. 4, or circular as illustrated in Fig. 5. The teeth may be radial as illustrated in Fig. 5 or non-radial as in Figs. 2 and 4. The essential feature is that there be a plurality of groups of splines around the periphery and that the intervening surfaces 11 be of greater area than the area of the top of any tooth.

Another feature is that if the surfaces 11 be arcuate and smooth they may constitute bearing surfaces to relieve the teeth 10 of gravity loading. In this case there is a definite clearance 12 between the top of any tooth and the bottom of the space separating adjacent teeth which spaces serve as lubricating passages. These bearing surfaces prevent so called run-out or disalinement of the splined end axis and eliminate the cause of most of the vibrations in conventional joint sets.

In Fig. 2 planes bisecting the teeth of any one group are parallel whereas in Fig. 5 planes bisecting all teeth are radial.

It will be noted that the flat portions 13 of the portions 11 serve to drive in the same manner as a tooth so that, in the event that the teeth should be sheared from the shaft end 4 there would still be driving connection between the member 2 and the shaft end as it is not likely that these larger sections 11 can be sheared off.

Various modifications and shapes will suggest themselves to one skilled in the art and I desire to be extended protection within the scope of the appended claims.

What I claim is:

1. A shaft having a plurality of groups of splines extending parallel to the axis thereof, the splines of each group being separated by non-bearing surfaces, and smooth curved surfaces separating said groups and constituting bearing surfaces.

2. A shaft having a plurality of groups of splines therearound, said splines being radial of said shaft, and non-splined surfaces having a radial length at least as great as said splines separating said groups.

3. A shaft having a plurality of groups of splines therearound, said splines being radial of said shaft, and smooth curved surfaces separating said groups, the total number of splines being materially greater than the number of surfaces separating said groups.

4. A splined shaft of rectangular cross-section having rounded corners with the sides of the rectangle between said corners each having a plurality of splines formed therein.

5. A shaft having a plurality of groups of splines therearound, the splines of any one of said groups being so formed that planes bisecting the teeth thereof are all parallel, and smooth curved surfaces connecting said groups.

6. A shaft having a plurality of groups of splines therearound, the splines of any one of said groups being so formed that planes bi-secting the teeth thereof are all parallel, two of such bi-secting planes in any one group being oppositely disposed about the axis of said shaft, and smooth curved surfaces connecting said groups.

7. A splined shaft having a plurality of groups of splines arranged around the circumference thereof in spaced relation, the splines of any one of said groups being so formed that a plane bi-secting any spline of any of said groups passes through the axis of said shaft, and non-splined portions separating said groups, said non-splined portions each having an area greater than the area of the top of any one of said splines.

8. A splined shaft having a plurality of groups of splines arranged around the circumference thereof in spaced relation, the splines of any one of said groups being so formed that a plane bi-secting any spline of any of said groups passes through the axis of said shaft, and curved portions separating said groups, said curved portions each having an area greater than the area of the top of any one of said splines.

9. A splined shaft having a plurality of groups of splines around the periphery thereof, all of said groups containing an equal number of splines, and smooth portions separating said splines, said smooth portions being less in number than the number of splines and of equal area with respect to each other and each being of greater area than the top of any one of said splines.

10. A splined shaft of polygonal cross-section with alternate sides of the polygon being splined, the remainder of said sides being non-splined, some of said sides being of arcuate shape in cross-section.

11. A splined shaft having a substantially octagonal cross-section with alternate sides thereof splined.

12. A splined shaft having a substantially octagonal cross-section with alternate sides thereof each having a group of splines formed therefrom, the remaining sides being curved.

13. A splined shaft of substantially hexagonal cross-section with alternate sides splined.

14. A shaft end of polygonal cross-section with the sides thereof non-parallel with respect to each other, some of said sides having splines formed therein.

15. A shaft end having a portion of the periphery thereof splined and the remainder thereof smooth, the radius of said remainder being at least as great as that of any of said splines, said remainder constituting a shaft bearing surface and acting to relieve said splines of shaft alining functions.

16. A shaft having a plurality of groups of splines separated by smooth portions, said smooth portions constituting bearing surfaces adapted to relieve said splines of the gravity loading of said shaft when in assembly.

17. A shaft having a plurality of groups of splines separated by smooth portions, said groups and said smooth portions each being at least three in number, said smooth portions constituting bearing surfaces adapted to relieve said splines of the gravity loading of said shaft when in assembly.

18. A shaft having four groups of splines each comprising a plurality of teeth, four smooth curved surfaces separating said groups, said four curved surfaces constituting bearing means which act to relieve the said teeth of the weight of the shaft.

19. The combination of two mating splined members each having a plurality of groups of splines separated by smooth portions, the roots of the splines of each member having substantial clearance with the mating teeth of the other member, the smooth portions of the members being in bearing contact.

20. The combination of two mating splined members each having a plurality of teeth separated by smooth curved portions, the roots of the splines of each member having substantial clearance with the mating teeth of the other member, the smooth portions of the members being in bearing contact.

CHARLES D. CUTTING.